(12) United States Patent
Kumpf

(10) Patent No.: US 9,906,115 B2
(45) Date of Patent: Feb. 27, 2018

(54) ELECTROMAGNETIC COUPLING APPARATUS

(71) Applicant: ERWIN A. LANG GMBH & CO. KG, Ravensburg (DE)

(72) Inventor: Hans-Peter Kumpf, Ravensburg (DE)

(73) Assignee: ERWIN A. LANG GMBH & CO. KG, Ravensburg (DE)

(*) Notice: Subject to any disclaimer, the term of this patent is extended or adjusted under 35 U.S.C. 154(b) by 254 days.

(21) Appl. No.: 14/762,411

(22) PCT Filed: Mar. 13, 2014

(86) PCT No.: PCT/EP2014/054974
§ 371 (c)(1),
(2) Date: Jul. 21, 2015

(87) PCT Pub. No.: WO2014/146969
PCT Pub. Date: Sep. 25, 2014

(65) Prior Publication Data
US 2015/0357898 A1     Dec. 10, 2015

(30) Foreign Application Priority Data

Mar. 18, 2013  (DE) .................... 20 2013 002 597 U

(51) Int. Cl.
*H02K 49/00* (2006.01)
*F16D 27/112* (2006.01)

(52) U.S. Cl.
CPC ........... *H02K 49/00* (2013.01); *F16D 27/112* (2013.01)

(58) Field of Classification Search
CPC ............... F16D 27/112; H02K 49/00
(Continued)

(56) References Cited

U.S. PATENT DOCUMENTS 5,046,594 A * 9/1991 Kakinuma ............ F16D 27/112
                                                  192/84.961
5,150,779 A * 9/1992 Booth ................... F16D 27/112
                                                  192/200

(Continued)

FOREIGN PATENT DOCUMENTS

DE  DE 202006016144 U1   2/2007
EP        0 643 236 A1   3/1995

(Continued)

OTHER PUBLICATIONS

European Patent Office. PCT International Search Report and Written Opinion dated Oct. 7, 2014, International Application No. PCT/EP2014/054974, Name of Applicant: Erwin A. Lang GMBH & Co. KG. German Language 9 pages.

*Primary Examiner* — Alex W Mok
(74) *Attorney, Agent, or Firm* — Moore & Van Allen PLLC; Henry B. Ward, III

(57) ABSTRACT

The present invention relates to an electromagnetic coupling apparatus (10) for drive arrangements, comprising:—an armature disc arrangement (14) which comprises at least one armature disc,—a rotor arrangement (12). In the case of this coupling apparatus, provision is made for the armature disc arrangement (14) to comprise at least one air gap-adjusting unit (LE) which has a closure screw (42) and which interacts with a fastening screw (44) for fastening the armature disc arrangement (14) to a drive shaft (28) in order to adjust an air gap (LS) between the armature disc arrangement (14) and the rotor arrangement (12).

13 Claims, 5 Drawing Sheets

(58) Field of Classification Search
USPC .................................................. 310/103, 90
See application file for complete search history.

(56) References Cited

U.S. PATENT DOCUMENTS

| | | | | |
|---|---|---|---|---|
| 5,195,625 | A * | 3/1993 | Chang .................. | F16D 27/112 192/200 |
| 5,250,921 | A * | 10/1993 | Van Laningham ... | F16D 27/112 192/84.941 |
| 5,370,209 | A * | 12/1994 | VanLaningham ..... | F16D 27/112 192/200 |
| 5,632,366 | A * | 5/1997 | Mullaney ............ | F04B 27/0895 192/209 |
| 5,642,798 | A * | 7/1997 | Muirhead ............... | F16D 13/72 192/113.23 |
| 6,129,194 | A * | 10/2000 | Booth .................. | F16D 27/112 192/200 |
| 6,194,803 | B1 * | 2/2001 | Heim ................... | F16D 27/112 192/84.941 |

FOREIGN PATENT DOCUMENTS

| | | |
|---|---|---|
| EP | 0 741 254 A2 | 11/1996 |
| WO | WO 2008146635 A1 | 12/2008 |

\* cited by examiner

ELECTROMAGNETIC COUPLING APPARATUS

The present invention relates to an electromagnetic coupling apparatus for drive arrangements, having at least one armature disc arrangement, comprising at least one armature disc, and a rotor arrangement.

In the case of such electromagnetic coupling apparatuses, a predetermined air gap has to be set between the armature disc arrangement or between the armature disc and a rotor arrangement, in order to preclude contacts between the armature disc arrangement and the rotor arrangement in the uncoupled state.

In the case of housing-mounted coupling apparatuses, i.e. coupling apparatus which are mounted on a housing of an auxiliary unit of a vehicle, such as e.g. an air-conditioning compressor, the air gap has to be set during the mounting of the coupling apparatus.

At present, the air gap is set, in practice, mostly by insetting adjusting washers differing in their thickness or by inserting different spring elements between the armature disc arrangement and the rotor arrangement. On the setting of the air gap, the armature disc arrangement of the coupling to be mounted has to be mounted on the auxiliary unit or a drive shaft of the auxiliary unit and removed until the predetermined air gap is set via the adjusting washers, since the air gap can be measured only in the mounted state of the armature disc assembly.

Specifically, firstly the air gap is measured in the mounted state of the coupling. If the predetermined or desired air gap is not yet set, the armature disc arrangement is completely demounted, and one or more adjusting washers are inserted. The armature disc arrangement is now mounted again and the air gap is re-measured. If the predetermined air gap has again not been set, the procedure is started from the beginning again. In the case of electromagnetic couplings, the armature disc arrangement is mostly pressed onto the drive shaft of the auxiliary unit, which makes the possibly repeated demounting of the armature disc arrangement very costly and time-consuming.

Furthermore, from the prior art there are known electromagnetic couplings of the type described in the document DE 20 2006 016 144 U1 which provide for an adjustability of the air gap. In the case of the coupling in this document, an armature disc assembly is constituted by a flange formed with a hub and by a further flange on which an armature disc is mounted. The armature disc flange has an internal thread and the hub flange has an external thread. The external thread of the hub flange interacts with the internal thread of the armature disc flange to adjust the air gap. The armature disc flange surrounds the hub flange. The armature disc flange is rotated relative to the hub flange by means of the threads engage in one another until the desired air gap is set between the rotor and the armature disc. The armature disc or the armature disc flange additionally has threaded bores which have to interact with bores in the hub flange to secure the set air gap. The armature disc flange here has to be further rotated relative to the hub flange until two threaded bores of the armature disc flange lie congruently with two bores of the hub flange, so that respectively one screw can be screwed into the two threaded bore/bore pairs, in order to secure the set air gap and prevent a further rotation between the hub flange and the armature disc flange.

The coupling according to the document DE 20 2006 016 144 U1 has a relatively complex construction, since firstly two flanges have to be provided with an internal and external thread, respectively, and the two flanges also have to have a plurality of bores or threaded bores which serve to secure the set air gap with the aid of a screw. The formation alone of a plurality of threaded bores or bores in the two flanges, which have to lie congruently over one another in specific positions for screwing in a screw, is relatively time-consuming and costly. The same applies to the formation of the relatively large threads on the two flanges according to this document.

Accordingly, it is an object of the present invention to provide an electromagnetic coupling which enables a simplification of the procedure described at the outset, and has a much less complex construction than the coupling described in the document DE 20 2006 016 144 U1.

This object is achieved with an electromagnetic coupling apparatus of the type described at the outset, in which the armature disc arrangement comprises at least one air gap-adjusting unit having a closure screw, which interacts with a fastening screw for fastening the armature disc arrangement to a drive shaft in order to adjust an air gap between the armature disc arrangement and the rotor arrangement.

With the air gap-adjusting unit having the closure screw, it can be achieved that, even when spacing adjusting means for adjusting the air gap between the armature disc arrangement and the rotor arrangement are required, these can be mounted without removing the entire armature disc arrangement from the drive shaft, and thus the air gap between the armature disc arrangement and the rotor arrangement can be adjusted quickly and simply as compared with the prior art.

In the event that the initial air gap which is set via the closure screw and the fastening screw does not correspond to the predetermined (desired) air gap to be achieved in the mounted state, the air gap-adjusting unit can, according to an embodiment of the invention, comprise at least one spacing adjusting means. The spacing adjusting means can be mounted on the armature disc arrangement via the closure screw. Depending on the air gap to be set or the present, measured air gap between the rotor arrangement and the armature disc arrangement, one or more spacing adjusting means are mounted on the armature disc arrangement via the closure screw in order to set a predetermined air gap. The spacing adjusting means may, preferably, be adjusting washers, but may also be spring elements or the like.

The closure screw can be removed from the armature disc arrangement. Depending on the measured air gap between the rotor arrangement and the armature disc arrangement, the spacing adjusting means required for setting the predetermined air gap can be mounted on the armature disc arrangement via the closure screw. The closure screw is subsequently connected to the armature disc arrangement again and the fastening screw is inserted to fasten the armature disc arrangement to a drive shaft and is screwed to the drive shaft. Then, the air gap is re-measured. If the predetermined air gap has again not been correctly set, it is merely necessary to remove or release the fastening screw and the closure screw and insert other or additional spacing adjusting means or change the number of spacing adjusting means. Subsequently, the closure screw and the fastening screw are again screwed to the armature disc arrangement and to the drive shaft respectively, with the result that the predefined air gap is set between the rotor arrangement and the armature disc arrangement via the spacing adjusting means and the closure screw. Compared with the prior art, the electromagnetic coupling apparatus according to the invention thus allows a very much simpler and less time-consuming adjustment of the air gap between the armature disc arrangement and the rotor arrangement.

According to a development of the invention, the fastening screw can extend through the closure screw. As already mentioned, if necessary, spacing adjusting means are mounted on the armature disc arrangement via the closure screw. Since, in most cases, a press fit exists between the armature disc arrangement and the drive shaft of the auxiliary unit, a certain expenditure of force is required for the final setting of the air gap, in order to bring the armature disc arrangement with the closure screw into its end position. This force is exerted simply and directly, via the fastening screw, on the closure screw and thus the armature disc arrangement, in order to mount the latter on the drive shaft in the end position determined by the spacing adjusting means and the closure screw, the air gap between the armature disc and the rotor arrangement being determined by the end position of the closure screw.

The closure screw can preferably have a flange-shaped section which extends in the radial direction. The flange-shaped section of the closure screw can serve for mounting the spacing adjusting means on the armature disc arrangement. The spacing adjusting means can, for example, bear against the flange-shaped section of the closure screw.

According to an embodiment of the invention, the armature disc arrangement can have a flange which extends in the radial direction. On the flange a hub-shaped section for receiving a drive shaft can preferably be formed. The armature disc arrangement is mounted on the drive shaft, for example of a compressor. This is effected via a hub-shaped section on the flange of the armature disc arrangement, which flange can at least sectionally receive the drive shaft.

The at least one spacing adjusting means can be arranged between the flange-shaped section of the closure screw and the flange of the armature disc arrangement. In order words, the at least one spacing adjusting means is mounted on the flange of the armature disc arrangement via the closure screw or the flange-shaped section of the latter, in order to be able to set the predetermined air gap.

According to an embodiment of the invention, the closure screw can be screwed into an opening of the flange of the armature disc arrangement. In doing so, the closure screw can adjoin the hub-shaped section of the flange in the axial direction.

According to a development of the invention, the position of the closure screw can be changed in the axial direction after screwing into the opening in the flange via the at least one spacing adjusting means. The at least one spacing adjusting means can be provided between the flange of the closure screw and the flange of the armature disc arrangement, be damped so to speak between the armature disc arrangement and the closure screw. Since the closure screw can no longer be screwed as far into the opening of the armature disc arrangement as without spacing adjusting means, the position of the closure screw in the opening in the flange changes. As a result, the position of the armature disc arrangement after screwing in the fastening screw is changed on the drive shaft for adjusting the air gap.

Preferably, the closure screw can be formed in such a manner that it receives a head of the fastening screw. A fastening force exerted on the fastening screw can be exerted, via the fastening screw, on the closure screw during the fastening of the armature disc arrangement.

According to an embodiment, the at least one spacing adjusting means can be formed substantially disc-shaped. Preferably, the closure screw can extend through the at least one spacing adjusting means.

The rotor arrangement can comprise at least one belt pulley bearing section for transmitting a driving force to the.

The present invention further relates to an auxiliary unit for a vehicle having a coupling apparatus of the above-described type. The auxiliary unit can be, for example, a compressor. In the case of the auxiliary unit according to the invention, the armature disc arrangement is fixedly connected to the drive shaft of the auxiliary unit via the hub-shaped section of the flange and the fastening screw. Here, the closure screw can be brought into abutment with the drive shaft of the auxiliary unit via the fastening screw.

The position of the armature disc arrangement on the drive shaft of the auxiliary unit can be changed, after screwing the fastening screw to the drive shaft, in dependence on the at least one spacing adjusting means.

The fastening screw can preferably be screwed into an opening in an axial end face of the drive shaft. In doing so, the axial end face of the closure screw can bear against the axial end surface of the drive shaft.

An embodiment of the present invention is described below with the aid of the appended figures, in which:

FIG. 1 shows a sectional view of the electromagnetic coupling apparatus according to the invention, which is designated generally by 10.

Figure 1:
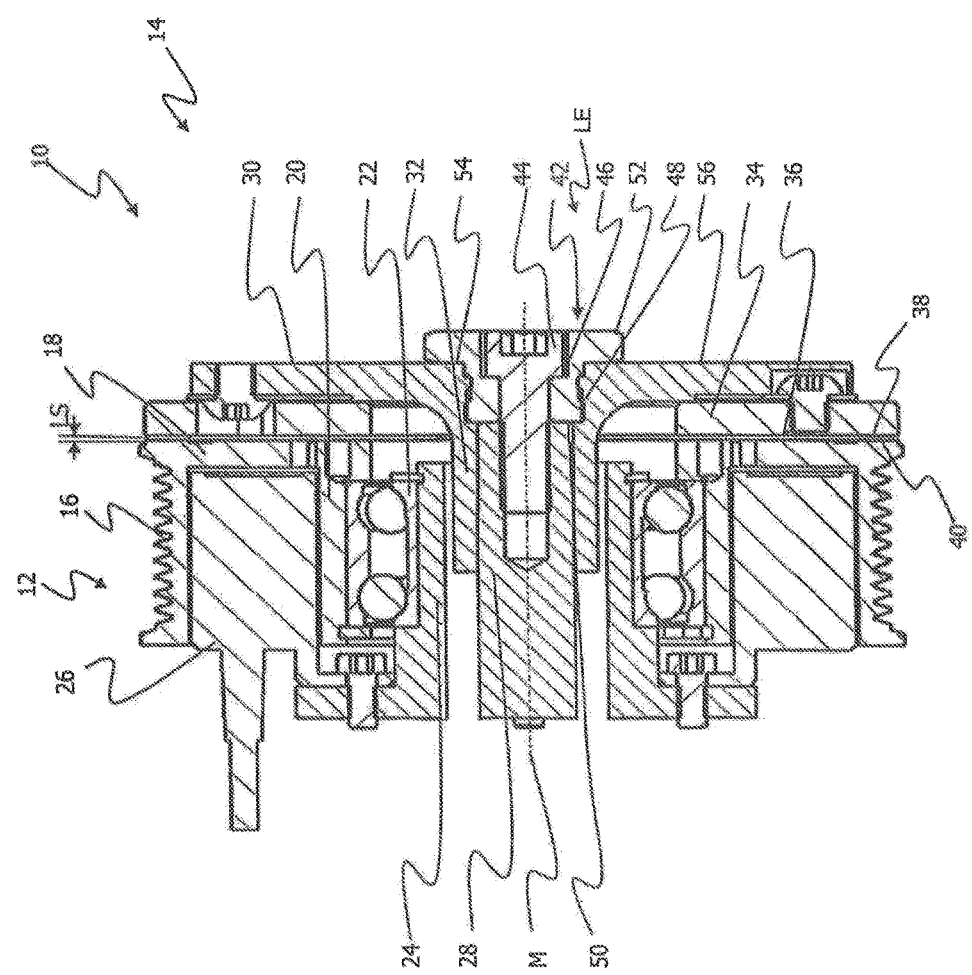
FIG. 1 shows a sectional view of the coupling apparatus according to the invention in the state mounted on a drive shaft.

The coupling apparatus 10 comprises a rotor arrangement 12 and an armature disc arrangement 14.

The rotor arrangement 12 comprises a belt bearing section 16, on which a drive belt (not shown) bears in the operation of the coupling apparatus 10. The drive belt serves for driving the rotor arrangement 12. The belt bearing section 16 is connected to a hub 20 of the rotor arrangement 12 via a flange section 18 extending in the radial direction.

The rotor arrangement 12 further has a rolling bearing 22, which with a connecting element 24 serves for connecting the rotor arrangement 12 or the coupling apparatus 10 to an auxiliary unit (not shown) of a motor vehicle, such as for example to a compressor. The connecting element 24 is mounted stationarily on the auxiliary unit, so that the hub 20 with the flange 18 and the belt bearing section 16 can roll via the rolling bearing 22 on the connecting element 24 in the operation of the coupling apparatus 10.

The coupling apparatus 10 comprises an electromagnetic device 26 with, for example, a magnet coil and a connecting cable for the power supply of the electromagnetic device 26. The electromagnetic device 26 is mounted, via the stationary connecting element 24, on the auxiliary unit (not shown) to be driven via the coupling apparatus 10. A drive shaft 28 of the auxiliary unit extends through a cutout in the connecting element 24 in the direction of the axis M.

The armature disc arrangement 14 is mounted on the drive shaft 28. The armature disc arrangement 14 comprises a flange 30. The flange 30 has a hub-shaped section 32, which is formed to receive the drive shaft 28. The hub-shaped section 32 and the drive shaft 28 are preferably connected to one another via a press fit.

An armature disc 34 is further arranged on the flange 30. The flange 30 and the armature disc 34 are preferably connected to one another via fastening means 36, such as for example screws. The armature disc 34 has an armature friction surface 38 facing the rotor arrangement 12. The flange section 18 of the rotor arrangement 12 has a rotor friction surface 40 facing the armature disc 34. Accordingly, the armature friction surface 38 and the rotor friction surface 40 lie opposite one another. A predetermined air gap LS is to be set between the armature friction surface 38 and the rotor friction surface 40.

The armature disc arrangement 14 or the coupling apparatus 10 has, for adjusting the air gap LS, an air gap-adjusting unit LE which comprises a closure screw 42. The closure screw 42 is penetrated by a fastening screw 44, which serves for fastening the armature disc arrangement 14 to the drive shaft 28 of the auxiliary unit (not shown). In other word, the closure screw 42 has an opening 46, through which the fastening screw 44 extends. The opening 46 is of stepped form, and the fastening screw 44 bears with its screw head against the step of the opening 46.

The closure screw 42 is provided on the flange 30 of the armature disc arrangement 14. In the flange 30 there is formed an opening 48 which comprises an internal thread, vaguely discernible in FIG. 1. The closure screw 42 and the hub-shaped section 32 of the flange 30 are formed coaxially and the closure screw 42 adjoins the hub-shaped section 32 in the direction of the axis M.

In the screwed-in state, the closure screw 42 bears against an axial end face 50 of the drive shaft 28.

The closure screw 42 has a flange-shaped section 52 extending in the radial direction. The side 54 of the flange 52 of the closure screw 42 which faces the flange 30 of the armature disc arrangement 14 bears, according to FIG. 1, directly against the surface 56 of the flange 30 of the armature disc arrangement 14, with the result that an initial air gap LS is set between the rotor arrangement 12 and the armature disc 14.

Figure 4:
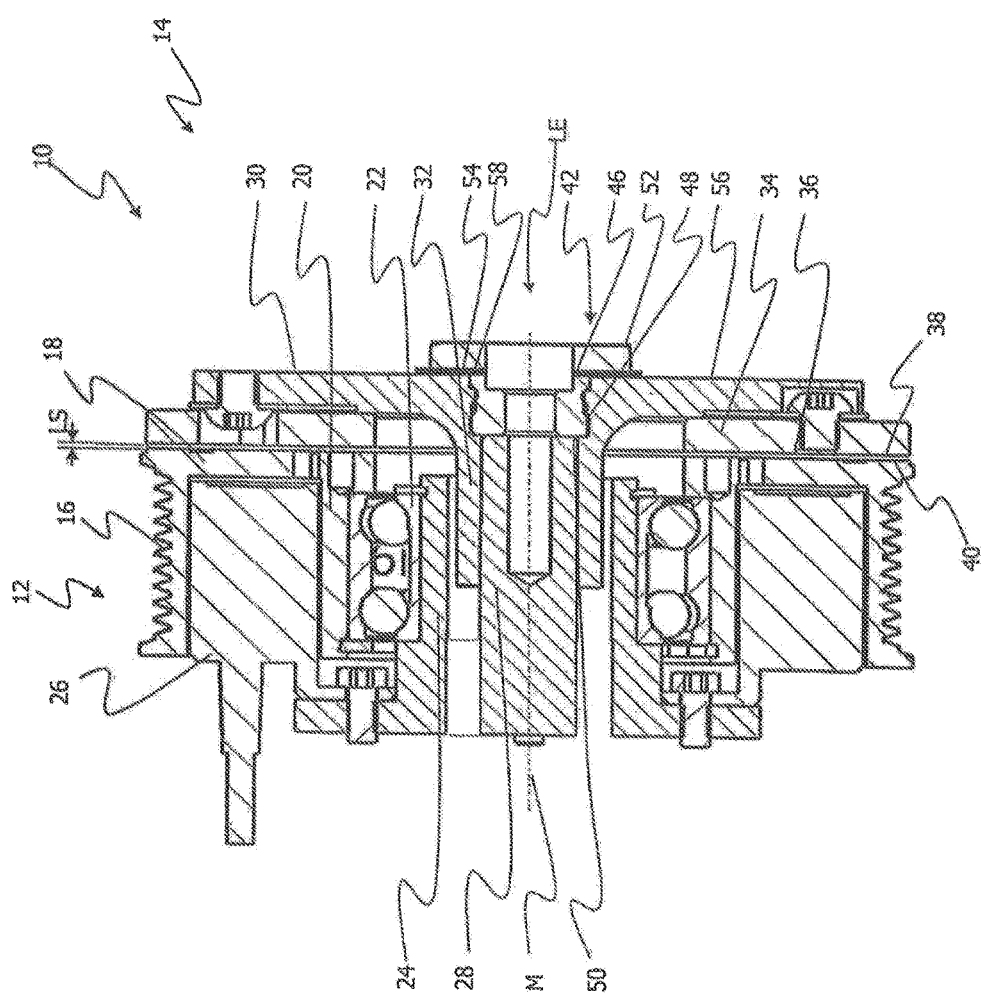
FIG. 4 shows a sectional view of the coupling apparatus according to the invention with the spacing adjusting means inserted and the closure screw mounted.
Figure 5:
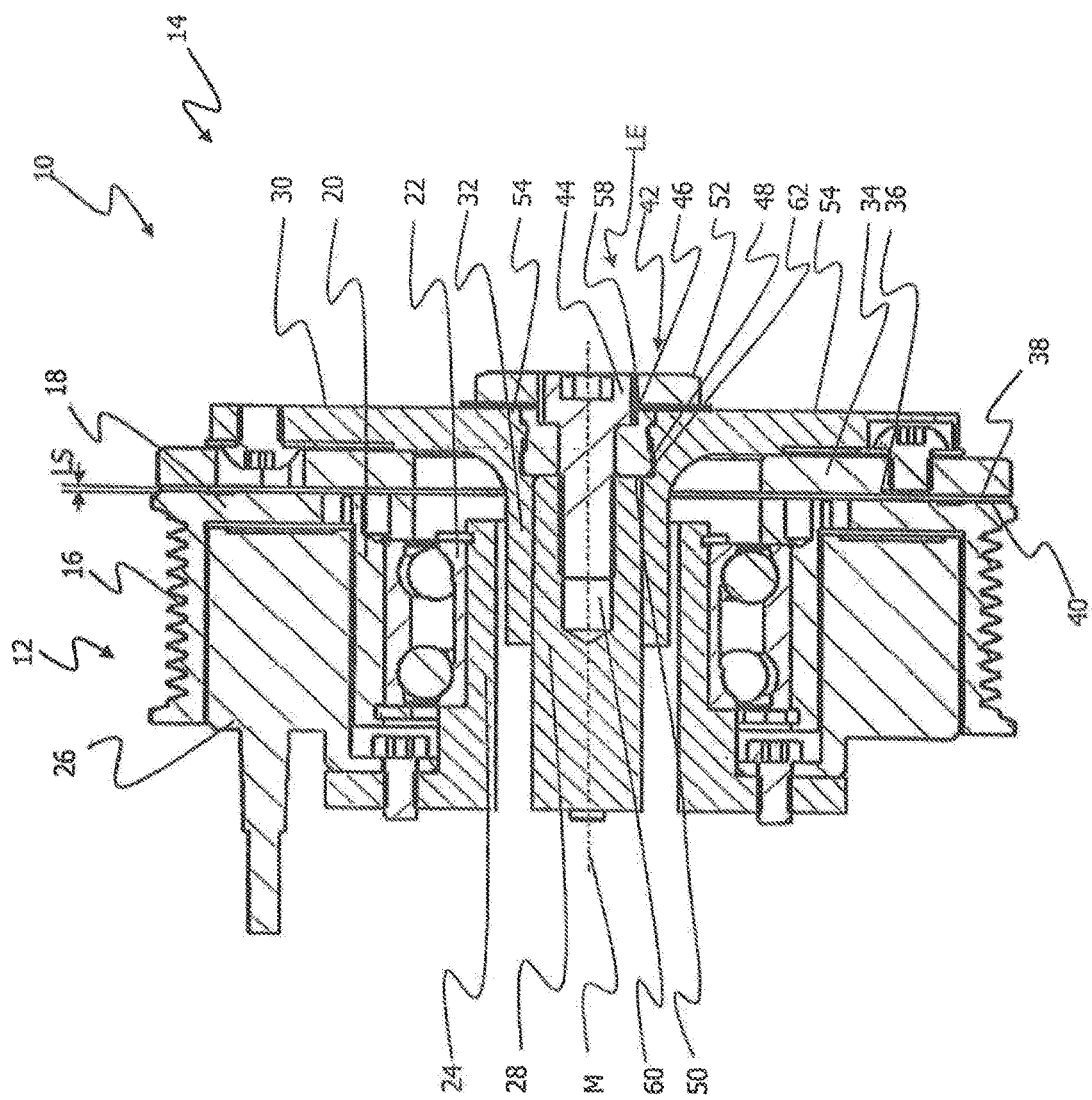
FIG. 5 shows a sectional view of the coupling apparatus according to the invention with the spacing adjusting means arranged between the closure screw and the armature disc arrangement.

In the event that the initial air gap LS does not correspond to the predetermined desired air gap LS, the air gap-adjusting unit LE can comprise a spacing adjusting means (FIGS. 4 and 5). In this case, the side 54 of the flange 52 and the surface 56 of the flange 30 of the armature disc arrangement 14 interact with the (in FIG. 1 not shown) spacing adjusting means (FIGS. 4 and 5) of the air gap-adjusting unit LE for adjusting the air gap LS between the armature friction surface 38 and the rotor friction surface 40.

The procedure during the adjustment of the air gap in the coupling apparatus 10 is described below with reference to FIGS. 2-5.

Figure 2:
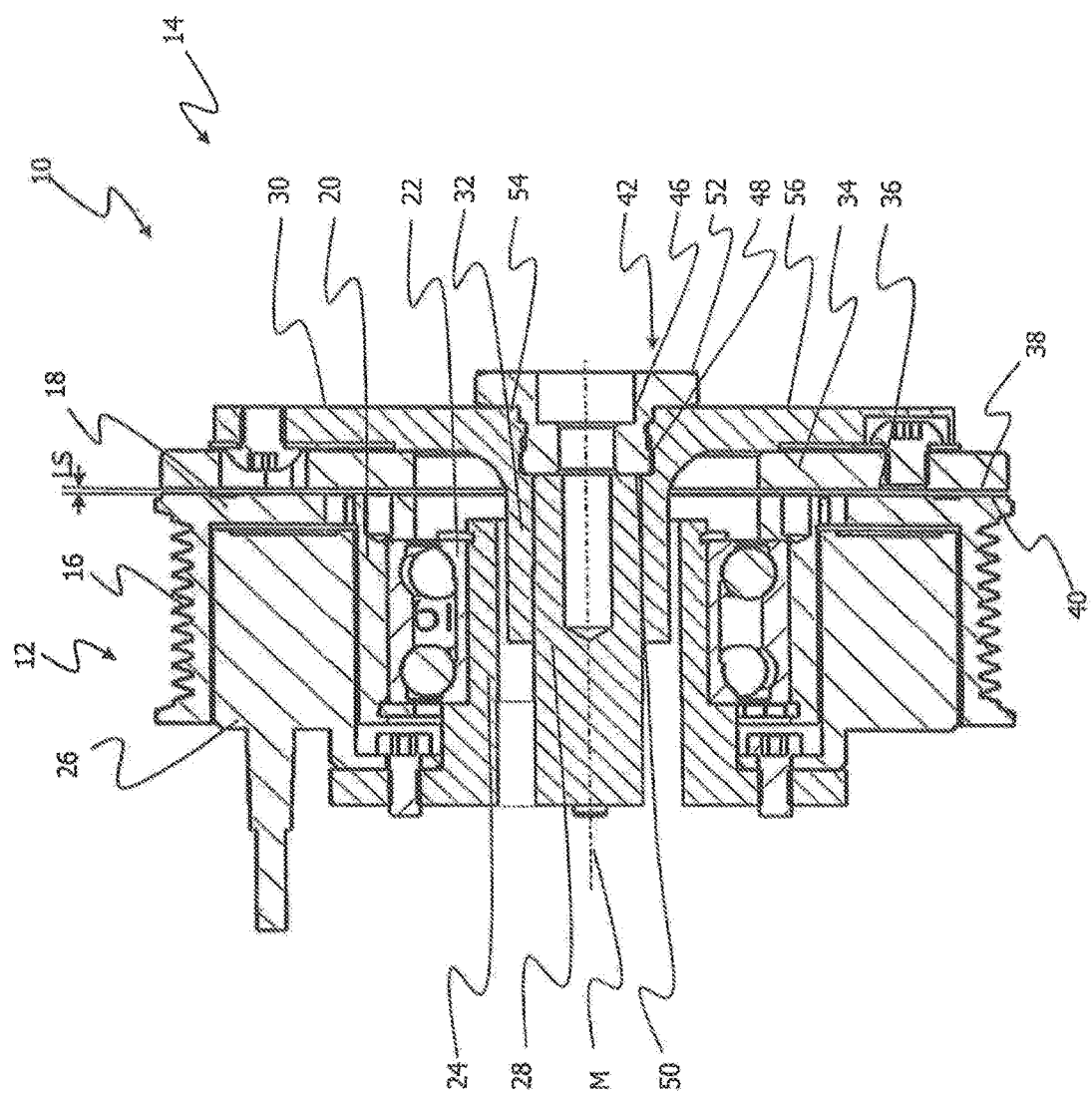
FIG. 2 shows a sectional view of the coupling apparatus according to the invention with the fastening screw demounted.

As shown in FIG. 2, firstly the fastening screw 44 is removed, so that the armature disc arrangement 14 is held solely via the press fit between the hub-shaped section 32 of the flange 30 on the drive shaft 28 of the auxiliary unit (not shown).

Figure 3:
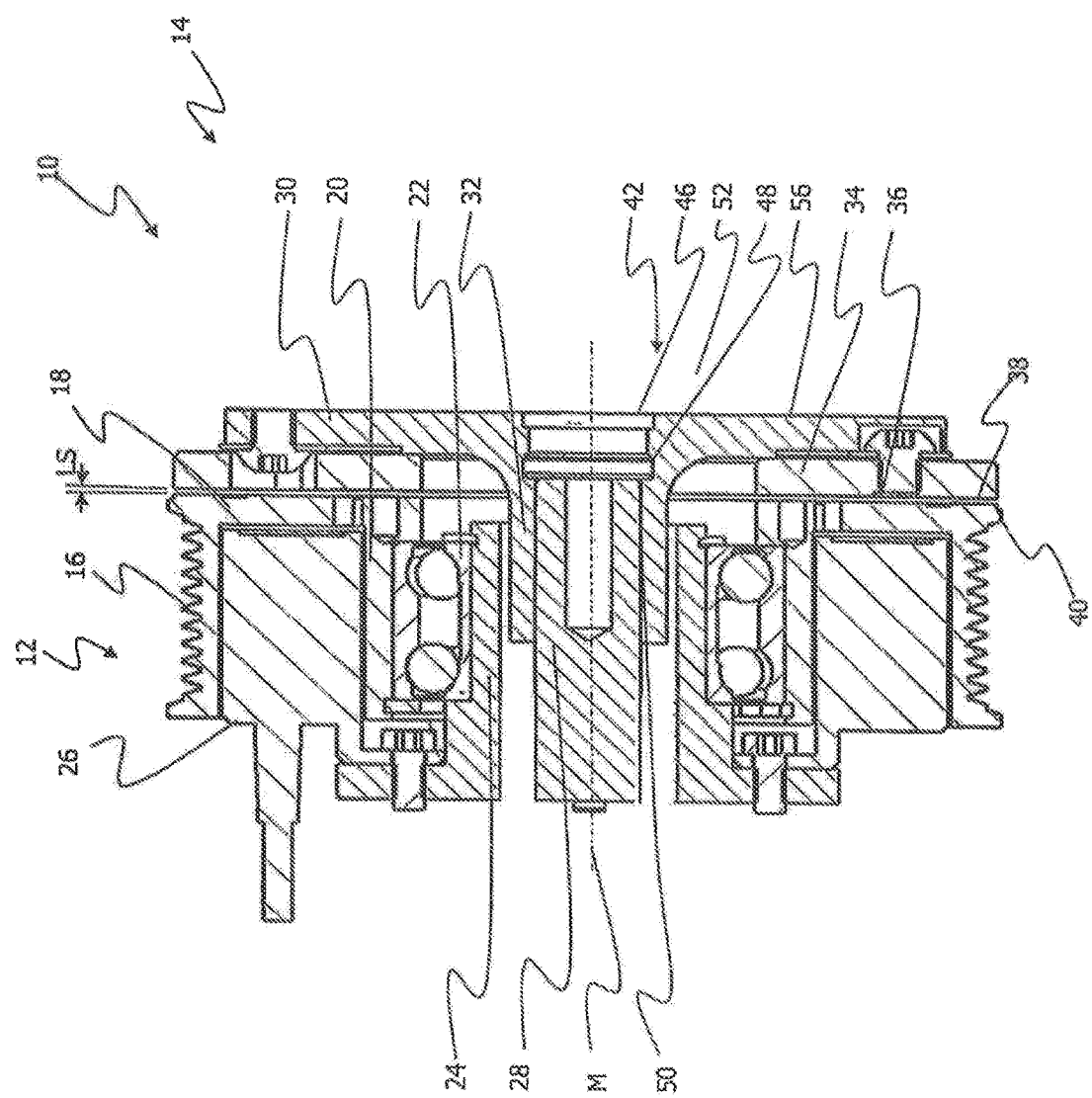
FIG. 3 shows a sectional view of the coupling apparatus according to the invention with the closure screw demounted.

Following this, as shown in FIG. 3, the closure screw 42 is unscrewed from the opening 48 in the flange 30.

Then, at least one spacing adjusting means 58 or the correct number of spacing adjusting means 58, which are shown merely schematically in FIG. 4, is inserted between the flange 30 of the armature disc arrangement 14 and the flange 52 of the closure screw 42 or slipped onto the closure screw 42, and the closure screw 42 is screwed into the opening 48 again. In other words, the surface 56 of the flange 30 of the armature disc arrangement 14 and the side 54 of the flange 52 of the closure screw 42 clamp the spacing adjusting means 58 between them.

As shown in FIG. 5, as the last step the fastening screw 44 is inserted through the closure screw 42 and screwed into an opening 60 of the drive shaft 28 or screwed to the drive shaft 28. As a result of the spacing adjusting means 58 being inserted between the side 56 of the flange 30 and the side 54 of the flange 52 of the closure screw 42, the closure screw 42 can no longer be fully screwed into the opening 48 of the flange 30. This results in a larger spacing (not shown) between the axial end face 50 of the drive shaft 28 and the axial end face 62 of the closure screw 42. This enlarged spacing may be in the range of a few hundredths of a millimetre. As a result of the fastening screw 44 being screwed into the opening of the drive shaft 28, the closure screw 42 or its axial end face 62 is brought into abutment with the axial end face 50 of the drive shaft 28. As a result, the position of the hub-shaped section 32 of the flange 30 or the position of the entire armature disc arrangement 14 is displaced on the drive shaft 28 by the thickness of the inserted spacing adjusting means, As a result of the position of the hub-shaped section 32 on the drive shaft 28 being changed, the desired air gap LS between the armature friction surface 38 and the rotor friction surface 40 is set.

The invention claimed is:

1. Electromagnetic coupling apparatus for drive arrangements, having:
    an armature disc arrangement which comprises at least one armature disc; and
    a rotor arrangement,
    wherein the armature disc arrangement comprises at least one air gap-adjusting unit having a closure screw, which interacts with a fastening screw for fastening the armature disc arrangement to a drive shaft in order to adjust an air gap between the armature disc arrangement and the rotor arrangement, and
    wherein the air gap-adjusting unit comprises at least one spacing adjusting means which is mountable on the armature disc arrangement via the closure screw,
    wherein the closure screw has a flange-shaped section which extends in a radial direction, and the armature disc arrangement has at least one flange which extends in a radial direction, and on which a hub-shaped section for receiving a drive shaft is formed, and
    wherein the at least one spacing adjusting means is arranged between the flange-shaped section of the closure screw and the at least one flange of the armature disc arrangement.

2. Electromagnetic coupling apparatus according to claim 1, wherein the fastening screw extends through the closure screw.

3. Electromagnetic coupling apparatus according to claim 2, wherein the at least one spacing adjusting means is formed disc-shaped, and the closure screw extends through the at least one spacing adjusting means.

4. Electromagnetic coupling apparatus according to claim 1, wherein the closure screw has a flange-shaped section which extends in the radial direction.

5. Electromagnetic coupling apparatus according to claim 1, wherein the armature disc arrangement has at least one flange which extends in the radial direction, and on which a hub-shaped section for receiving a drive shaft is formed.

6. Electromagnetic coupling apparatus according to claim 1, wherein the closure screw is screwable into an opening of the flange of the armature disc arrangement, and adjoins the hub-shaped section of the flange in the axial direction.

7. Electromagnetic coupling apparatus according to claim 6, wherein the position of the closure screw is changeable in the axial direction after screwing-in in the opening in the flange via the at least one spacing adjusting means.

8. Electromagnetic coupling apparatus according to claim 1, wherein the closure screw is formed in such a manner that it receives a head of the fastening screw, a fastening force being exerted on the closure screw by the fastening screw.

9. Electromagnetic coupling apparatus according to claim 1, wherein the rotor arrangement comprises at least one belt pulley bearing section.

10. Auxiliary unit for a motor vehicle having a coupling apparatus according to claim 1, wherein the armature disc arrangement being fixedly connected to a drive shaft of the auxiliary unit via the hub-shaped section of the flange and the fastening screw, and
wherein the closure screw can be brought into abutment at least sectionally with the drive shaft via the fastening screw.

11. Auxiliary unit according to claim 10, wherein the position of the armature disc arrangement on the drive shaft is changed, after screwing the fastening screw to the drive shaft, in dependence on the at least one spacing adjusting means.

12. Auxiliary unit according to claim 10, wherein the fastening screw is screwable into an opening in an axial end face of the drive shaft, and in doing so an axial end face of the closure screw bears against the axial end surface of the drive shaft.

13. Electromagnetic coupling apparatus for drive arrangements, having:
- an armature disc arrangement which comprises at least one armature disc; and
- a rotor arrangement,
- wherein the armature disc arrangement comprises at least one air gap-adjusting unit having a closure screw, which interacts with a fastening screw for fastening the armature disc arrangement to a drive shaft in order to adjust an air gap between the armature disc arrangement and the rotor arrangement, and
- wherein the air gap-adjusting unit comprises at least one spacing adjusting means which is mountable on the armature disc arrangement via the closure screw,
- wherein the fastening screw extends through the closure screw, and
- wherein the at least one spacing adjusting means is formed disc-shaped, and the closure screw extends through the at least one spacing adjusting means.

* * * * *